US009278674B2

(12) United States Patent
Gadzinski

(10) Patent No.: US 9,278,674 B2
(45) Date of Patent: Mar. 8, 2016

(54) VEHICLE OPERATOR DISPLAY AND ASSISTIVE MECHANISMS

(75) Inventor: John Gadzinski, Virginia Beach, VA (US)

(73) Assignee: Engineered Arresting Systems Corporation, Aston, PA (US)

( * ) Notice: Subject to any disclaimer, the term of this patent is extended or adjusted under 35 U.S.C. 154(b) by 0 days.

(21) Appl. No.: 13/603,610

(22) Filed: Sep. 5, 2012

(65) Prior Publication Data

US 2013/0184904 A1     Jul. 18, 2013

Related U.S. Application Data

(60) Provisional application No. 61/587,802, filed on Jan. 18, 2012, provisional application No. 61/679,879, filed on Aug. 6, 2012.

(51) Int. Cl.
| | |
|---|---|
| *B60T 8/17* | (2006.01) |
| *G01C 23/00* | (2006.01) |
| *G08G 5/00* | (2006.01) |

(52) U.S. Cl.
CPC ............. *B60T 8/1703* (2013.01); *G01C 23/00* (2013.01); *G01C 23/005* (2013.01); *G08G 5/0021* (2013.01)

(58) Field of Classification Search
CPC .. B64C 25/426; B60T 8/1703; G01C 23/005; G01C 23/00; G08G 5/025; G08G 5/0021; B60K 2350/1068
USPC .......................................................... 701/16
See application file for complete search history.

(56) References Cited

U.S. PATENT DOCUMENTS

| | | | | |
|---|---|---|---|---|
| 3,949,361 | A | * | 4/1976 | Replogle ........................ 340/464 |
| 4,368,517 | A | * | 1/1983 | Lovering ......................... 701/16 |
| 4,847,589 | A | * | 7/1989 | Dobbins ........................ 340/326 |
| 5,195,808 | A | | 3/1993 | Johnsen |
| 5,657,009 | A | * | 8/1997 | Gordon .......................... 340/968 |
| 6,112,141 | A | * | 8/2000 | Briffe et al. ..................... 701/14 |
| 8,224,507 | B2 | | 7/2012 | Edwards et al. |
| 2003/0158698 | A1 | * | 8/2003 | Glazerbrook ................. 702/140 |
| 2004/0167685 | A1 | * | 8/2004 | Ryan et al. ....................... 701/16 |
| 2004/0202001 | A1 | * | 10/2004 | Roberts et al. ................ 362/494 |
| 2006/0129292 | A1 | | 6/2006 | Ohkubo |

(Continued)

FOREIGN PATENT DOCUMENTS

| | | |
|---|---|---|
| JP | 2933660 | 8/1999 |
| JP | 2004345368 | 12/2004 |
| JP | 2006160193 | 6/2006 |

OTHER PUBLICATIONS

Michigan Pupil Transportation Act of 1990, MCL 257.1855.*

(Continued)

*Primary Examiner* — Calvin Cheung
*Assistant Examiner* — Courtney Heinle
(74) *Attorney, Agent, or Firm* — Kilpatrick Townsend & Stockton LLP; Dean W. Russell

(57) ABSTRACT

Detailed are assistive mechanisms for vehicle operators designed to reduce risks associated with degraded landing and other situations. Some mechanisms may include a display with a visual indicator located within the peripheral field of view of an operator. Aural alerts may also be employed. Information suggesting degradation of, for example, ground deceleration performance may alert the operator to perform unusual or abnormal actions to mitigate hazards produced by the performance degradation.

8 Claims, 4 Drawing Sheets

(56) References Cited

U.S. PATENT DOCUMENTS

| | | | |
|---|---|---|---|
| 2008/0030073 A1* | 2/2008 | Goodman et al. | 303/191 |
| 2008/0154445 A1* | 6/2008 | Goodman et al. | 701/3 |
| 2009/0125169 A1* | 5/2009 | Edwards et al. | 701/16 |
| 2011/0128139 A1* | 6/2011 | Tauchi et al. | 340/439 |
| 2011/0246003 A1* | 10/2011 | Lafon et al. | 701/16 |
| 2012/0324771 A1* | 12/2012 | Safavi et al. | 40/452 |

OTHER PUBLICATIONS

International Search Report and Written Opinion dated Apr. 22, 2013 in Application No. PCT/US2013/020710.
PCT/US2013/020710, International Preliminary Report on Patentability dated Jul. 31, 2014. 6 pages.
Korea Patent Application No. 10-2014-7022488, Office Action dated Jan. 8, 2016.

* cited by examiner

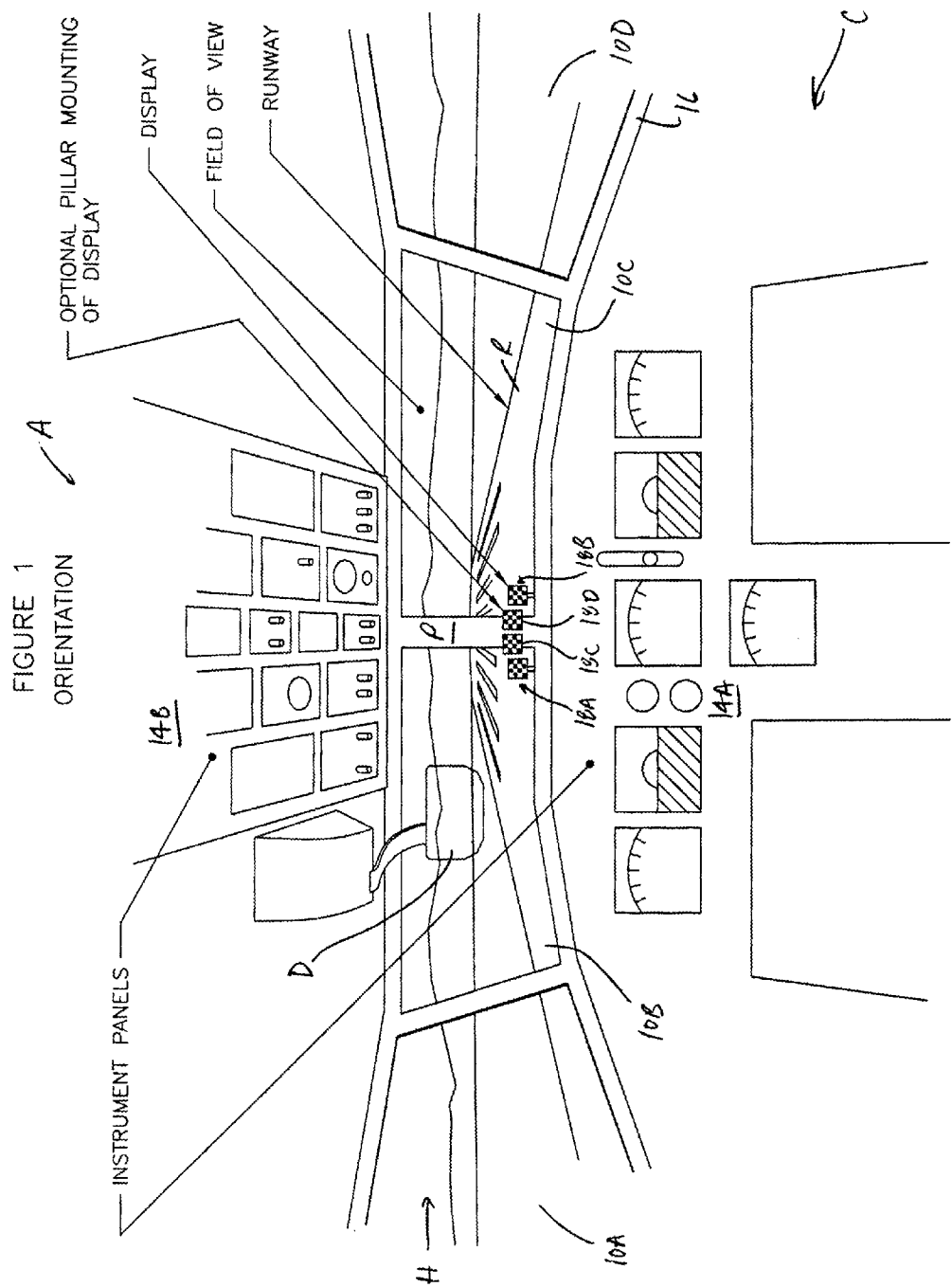

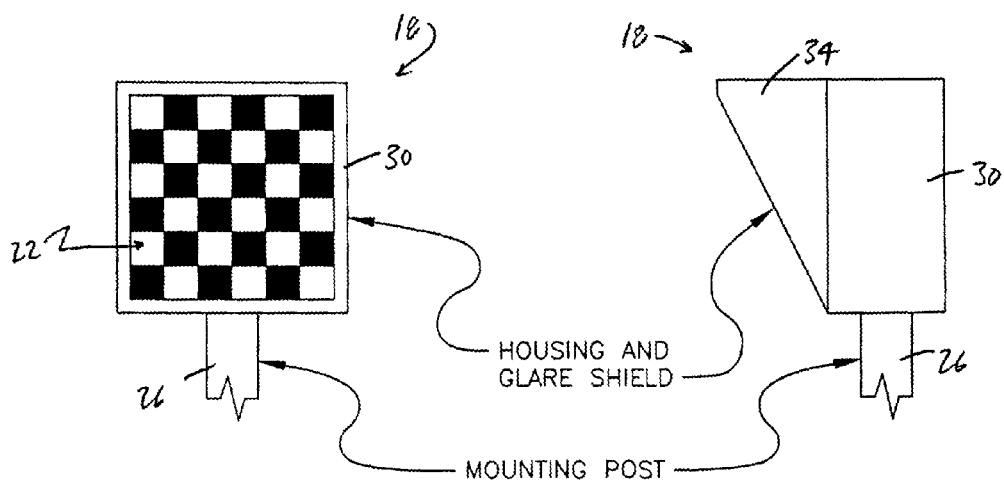

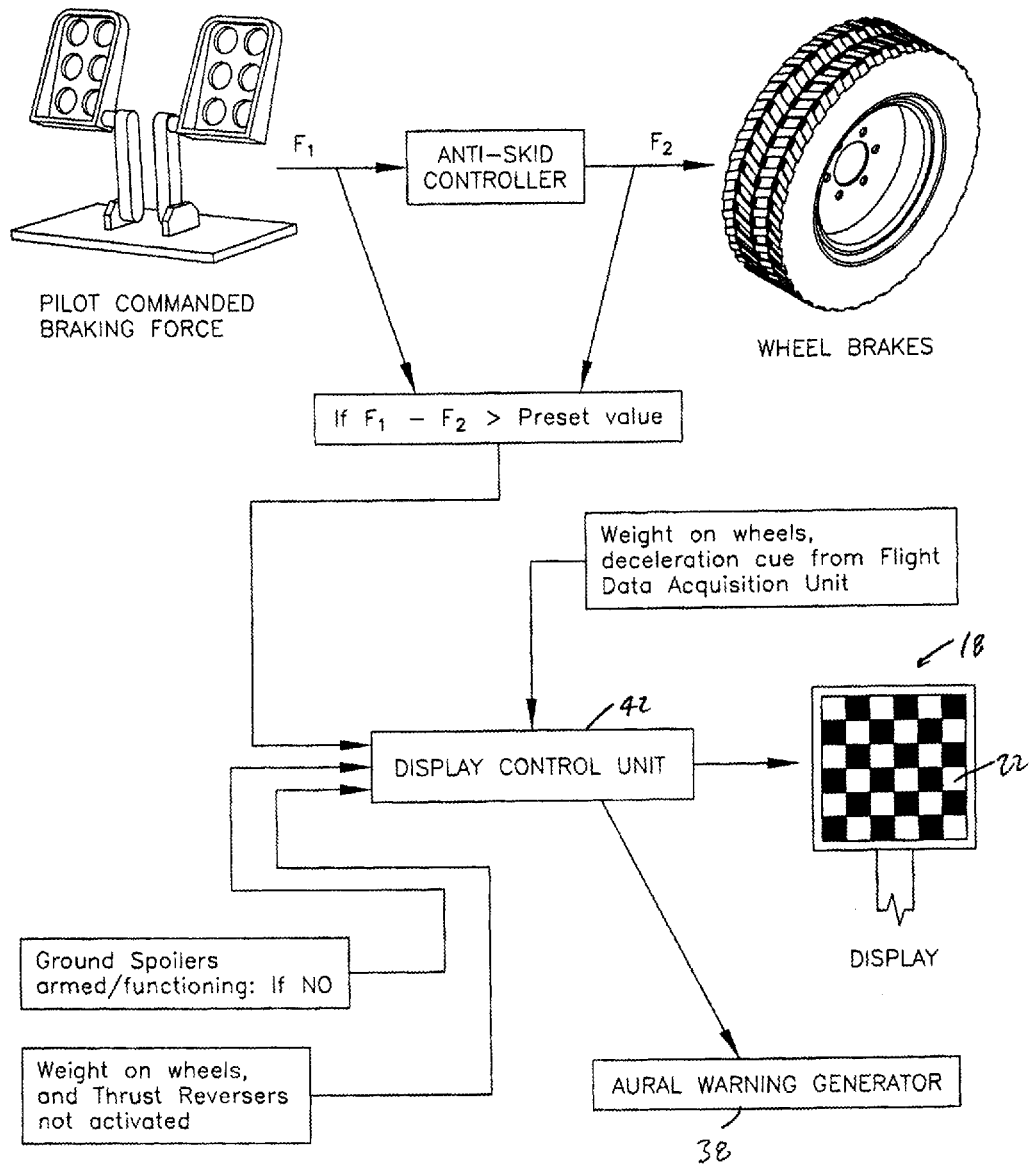

DISPLAY

DETAILED VIEW
FRONT OF DISPLAY

DETAILED VIEW
FRONT OF DISPLAY

VEHICLE OPERATOR DISPLAY AND ASSISTIVE MECHANISMS

CROSS-REFERENCE TO RELATED APPLICATIONS

This application claims the benefit of and priority to (1) U.S. Provisional Patent Application Ser. No. 61/587,802, filed Jan. 18, 2012, entitled "Display Mechanism for Communicating Transport Vehicle Related Ground Deceleration Alerts to the Operators of an Aircraft or Vehicle for the Purposes of Failure Sensitive Mitigation Actions," and (2) U.S. Provisional Patent Application No. 61/679,879, filed Aug. 6, 2012, entitled "Vehicle Operator Display and Assistive Mechanisms," the entire contents of both of which are incorporated herein by this reference.

FIELD OF THE INVENTION

This invention relates to systems and methods for providing information to (at least) vehicle operators and more particularly, but not necessarily exclusively, to mechanisms and techniques for supplying human pilots with information in manners designed to assist the pilots in coping with probable degradation of ground deceleration performance of their associated vehicles.

BACKGROUND OF THE INVENTION

Commonly-owned U.S. Pat. No. 8,224,507 to Edwards, et al. (the "Edwards patent"), whose contents are incorporated herein in their entirety by this reference, identifies rationales for improving information available to pilots of, for example, soon-to-land aircraft as to conditions likely to be encountered upon landing. Arguably the most famous recent circumstance in which lives were lost because of inadequate information about landing conditions delivered to a flight crew is the crash of Southwest Airlines Flight No. 1248 on Dec. 8, 2005, which flight departed the end of a runway and left the airfield boundary at Midway International Airport in Chicago, Ill. Quoting the USA Today newspaper, the Edwards patent states:

... the pilots "assumed the runway was in 'fair' condition, based on reports from other pilots radioed to them by air traffic controllers." However, subsequent analysis of objective data "show[ed] the conditions were 'poor' at best," with the runway "so slippery that it would have been difficult for people to walk on, providing minimal traction for the jet's tires as pilots tried to slow down."

See Edwards patent, col. 2, 11. 22-29.

The reason the pilots reporting those "fair" conditions had no manner of discerning their actual brake system performance was because the information about those systems was not designed to be measured, nor was it designed to be delivered to the flight crews. It is essentially impossible for pilots to discriminate between the aerodynamic forces acting upon an aircraft and the ground-based braking forces during a landing. As a result, the risks associated with poor ground-based braking system performance are not visible to a pilot in the act of directing his aircraft during such a maneuver.

Accordingly, detailed in the Edwards patent are systems and methods of improving or increasing (or both) the information available to operators in these and other circumstances. In some systems disclosed in the Edwards patent, objective information relating to performance of one aircraft using a runway is transmitted to an aircraft scheduled next or soon to use the runway for evaluation by the operator of that aircraft. Among many advantages of these systems are that they provide more objective information than conventional reports (which may consist of as little as a qualitative assessment of "good," "fair," or "poor"), the information may be provided in real-time (or near real-time), and the information may be generated without closing a runway to conduct conventional mechanical, ground-based friction testing.

Certain systems of the Edwards patent contemplate providing a vehicle operator with information relating to both (A) brake pressure commanded by an operator of an aircraft upon landing on a runway and (B) brake pressure delivered to the brakes of the aircraft after anti-skid control computer calculations are performed on-board that aircraft. Although other information may be provided additionally or alternatively, recently-obtained commanded and delivered brake pressure information may be especially valuable to operators of soon-to-land aircraft, as the information relates directly to what the operators will imminently experience. It thus may differ from the information most desired by engineers or regulatory authorities, for example, tasked with after-the-fact evaluation of runway conditions or an engineering analysis of aircraft performance.

Indeed, while humans are not considered "machines," they do operate under industry recognized cognitive limitations when in the process of interacting with mechanical devices. This relationship between the performance of a human and how that affects the performance of a machine is known as the field of "human factors" study. Recognizing human limitations and creating communication paths between vehicle and operator likely to overcome the limitations is thus a useful and significant goal.

As suggested by the accident at Midway Airport (among other events), unexpected degradation in ground-based deceleration systems can drastically erode safety and lead to catastrophic consequences any time a vehicle is decelerating on a surface while employing both aerodynamic and ground-based deceleration systems. For a landing aircraft, the operator must employ muscle memory techniques for engaging ailerons, rudder, elevator, and throttle while simultaneously directing his vision to the designated operating runway. While travelling down the surface of a runway and in controlling both lateral movement and longitudinal movement of the aircraft, the pilot or operator currently has no automated method of alert (other than his own qualitative "feeling") to queue an alternate sequence of actions should degraded system performance make such a decision advisable.

More specifically, a human operator of a decelerating aircraft must simultaneously control three dimensions of movement. In addition to controlling lateral and longitudinal movement of the aircraft, prior to contact with the ground he must align the flight path of the vehicle with the orientation of the surface on which he is to decelerate. This act requires the use of both feet and both hands to operate the rudder, ailerons, elevator, and throttle(s) of the aircraft. Meanwhile, the pilot's vision must be focused outside so that a continuous and speedy feedback loop develops between his visual cues and the actions of his hands and feet.

All landings involving human manipulation of controls are "visual" landings even though automation and navigational instruments may have delivered a craft to a position where such an event can take place. To this degree all such events require an operator of a craft to utilize a field of view designed specifically for viewing the environment outside the cabin or cockpit of the vehicle. However, the human mind is limited in its ability to process concurrent information at a conscious level of awareness. Attention is the cognitive mechanism in which an individual selects and processes important information while filtering and ignoring irrelevant information. Many factors can affect attention ranging from the physiological effects of stress to recognized cognitive limitations of the human brain. The concept of the "attentional blink," for instance, represents the inability to identify the second of two targets when the two are presented in close temporal succession or rapid sequence. This represents a long-lasting attentional deficit that is due to the length of time an identified object occupies attentional capacity, or remains in the person's awareness. In this case, this attentional deficit can mask important real-time deceleration system performance since current aircraft are not designed to display alerts or warnings of this nature in the visual field of view used for landing. Studies have documented, however, that perceptual, spatial and temporal cues have been found to be effective in manipulating attention during periods in which attentional blink is most likely to exist. This is but one example of a range of human factors issues that can create barriers to the effective human integration with aircraft systems designed to produce a ground deceleration during the landing maneuver.

The science of procedural memory teaches that the cognitive limitations of a pilot will not allow him to perform more than one analytical function at a time. Functions that require more than one action are employed using muscle memory as developed through repetition and training. Procedural memory is memory for how to do something. It usually resides just below a person's conscious awareness and guides the processes humans perform such as when tying shoes, riding a bicycle, or landing an airplane. Procedural memories are used without the need for conscious control or attention. For a pilot landing an airplane, the continuous analysis of where the direction his flight and ground path take him becomes his sole focus. In the study of human factors he is said to be "task saturated" because the task of controlling the flight path of the vehicle maximizes his abilities of perception and analysis at a certain level of awareness. He therefore must rely on procedural skill to accomplish any other demands he may encounter.

To acquire a procedural skill, one must pass through three phases. The first is the "cognitive" phase, which is when attention is most significant. It is the time when a person organizes and understands how parts come together as a whole. The second phase is the "associative" phase, which involves repeating the practice until patterns emerge and the skill is learned. Important stimuli are incorporated and irrelevant information is dropped, so the ability to differentiate the two is important for perfecting the skill. The third phase is the "autonomous" phase, which involves perfecting the skill so that it seems automatic. The ability to discriminate important from irrelevant information is quicker, more accurate, and requires less thought process.

The landing environment, in which a pilot is focused on using visual cues to operate the aircraft systems, relies entirely on this autonomous phase of memory. Without a cue, or signal, to do things differently due to deteriorating conditions, a pilot or operator will continue with procedural memory despite an unfavorable outcome. By contrast, a cue could provide a signal to alert and redirect the pilot's attention to implement a different set of procedural memories.

Furthermore, decisions concerning what actions are appropriate ("go around" or "continue," for example) are analyzed prior to the event so the operator need only be alerted to an expected cue to make an immediate assessment of his actions and continued techniques. This environment is classified as a "task saturated" one because there are so many actions taking place that there is very little room to employ a human function that relies upon anything but the simplest of cognitive alerts. This is an area where the possibility of errors due to perception and technique are greatly increased and where integration of man to machine is most important. It is also the state in which a pilot's vision is entirely dedicated outside the aircraft, away from his cockpit instruments.

Eye direction normally coincides with attention; however, research regarding the human detection of signals indicates that the mind processes more information peripherally than thought possible. As attention is directed across a person's field of vision (centrally and peripherally), items falling within what is referred to as the "attention spotlight" will be preferentially received, regardless of eye direction. In other words, humans can attend to something without looking directly at it, as long as it lies within the field of view being utilized.

Human visual cognition is particularly acute when a changing light source occurs within the peripheral vision of the operator. That changing light source can be either a flashing color or an alternating color(s), for example, and may (but need not necessarily) incorporate an alternating "wig wag" alert using one color or alternating two colors in the same display. Since the field of view of the pilot or operator is limited to the forward visibility above the instrument glare shield during a ground deceleration maneuver, placing a cueing or alerting device in this area would beneficially capture the operator's peripheral vision. Alternatively or additionally, including an aural alert may be advantageous.

Research performed regarding high task-loaded environments such as this indicates that the response to an alert must by necessity be a binary one, meaning that an alternate technique constituting a pre-learned muscle memory sequence is the only plausible consequence of an alert occurring during this phase of operation. Such a muscle memory response would include the necessary manipulation of the controls required to properly configure the vehicle for maximum effective deceleration and control.

Finally, the concept of "safety" is in effect the state in which exposure to risk is reduced to an acceptable level. "Risk" may be defined as the likelihood that a hazard relating to ground deceleration will result in an unwanted outcome that may produce harm to property, people, or both property and people. To have a "safe" system it is necessary to articulate the details that make up any given hazard. For the purposes of an aircraft decelerating on the surface, these hazards may include (but are not limited to) a difference between commanded and delivered wheel brake forces as the result of the actions of an anti-skid system (as noted above), the failure of a spoiler system to apply downward forces to a wheel brake system, degraded or absence of thrust reverser forces, a braking performance significantly different than selected by an automatic braking system, a failure of a pneumatic tire, the failure of a braking force delivery system such as hydraulics, or a tire to ground interaction for which an anti-skid system significantly reduces delivered braking forces. When these hazards occur during the time when a vehicle is travelling on a surface for the purpose of decelerating, the pilot flying currently has no indication of the hazards within the field of view he must use to control his vehicle while utilizing the muscle memory techniques as described above. The issue is sufficiently acute in connection with unrecognized deactivation of speedbrakes on aircraft that the National Transportation Safety Board recently recommended that warning horns be installed on jetliners to alert pilots if the speedbrakes cease functioning.

SUMMARY OF THE INVENTION

The present invention provides assistive mechanisms designed to reduce risks associated with degraded landing and other situations. Some versions of the invention include a display unit with a visual indicator located above the glare shield or dashboard of a cockpit, cabin, or other area located within the normal field of view of the operator. The invention also may include a distinctive aural alert designed to be easily distinguished from other aural alerts the vehicle may employ for other purposes. A function of these alerts is to take the measurements supplied from non-theoretical and direct ground-deceleration system components (such as not but limited to those discussed in the Edwards patent) and provide an indication of system function that has been determined to be less than a predetermined level of desirability. The alerts will then enable the operator to capture human and mechanical based degradations and employ an operational technique to mitigate the hazards produced by such degradation in system function.

Various embodiments of an alerting device may include a display unit with a visual indicator comprising multiple pixels. The device also may include a mounting post and a glare shield if desired or appropriate. Individual pixels, or contiguous sets of pixels, preferably are colored red and amber alternately, although other colors may be employed instead. Red and amber are preferred colors at least in part because they are used in human-factors designs of cockpits, with amber representing a cautionary alert and red representing an emergency. The indicator may be configured to allow for, e.g., (1) flashing amber pixels, (2) flashing red pixels, (3) flashing amber and red pixels, (4) steady (non-flashing) illumination of amber pixels, and (5) steady (non-flashing) illumination of red pixels. Alternatively or additionally, the indicator may define letters, words, or symbols or flash colors alternately on different portions of the device. The configuration may be a separate indicator, incorporated as an alert displayed on a heads-up navigation device, or mounted to a windshield pillar, for example. Light intensities may vary for day or night conditions, for example, or otherwise as suitable. Similarly, flashing frequencies may vary. Information conveyed by the device to a vehicle operator may assist the operator in mitigating hazards.

It thus is an optional, non-exclusive object of the present invention to provide systems and methods for providing information to (at least) vehicle operators.

It is another optional, non-exclusive object of the present invention to provide mechanisms and techniques for supplying human pilots with information in manners designed to assist the pilots in coping with probable degradation of ground deceleration performance of their associated vehicles.

It is also an optional, non-exclusive object of the present invention to provide display units with visual indicators designed to illuminate in the normal peripheral fields of view of the pilots.

It is a further optional, non-exclusive object of the present invention to provide aural alerts to pilots.

It is, moreover, an optional, non-exclusive object of the present invention to provide colored cues to vehicle operators, with different colors signifying different levels of required action.

It is an additional optional, non-exclusive object of the present invention to provide display indicators in which individual or sets of red and amber pixels may flash or be illuminated steadily depending on actual or anticipated conditions.

It is another optional, non-exclusive object of the present invention to provide an option for an alert as described above to signal an automatic flight control response designed to mitigate the landing risk such as, but not limited to, automatic employment of maximum wheel brake effort, ground spoilers, or thrust reverse.

Other objects, features, and advantages of the present invention will be apparent to those appropriately skilled in the art with reference to the remaining text and drawings of this application.

BRIEF DESCRIPTION OF THE DRAWINGS

FIG. 1 is a simplified, operator's-eye view of a runway or similar surface along which a vehicle may travel together with exemplary alerting devices.

FIG. 2 is a front view of an alerting device of FIG. 1.

FIG. 3 is a side view of the alerting device of FIG. 2.

FIG. 4 is a flow diagram identifying exemplary conditions affecting presentation of information by the alerting device(s) of FIGS. 1-3.

DETAILED DESCRIPTION

Figure 5A:
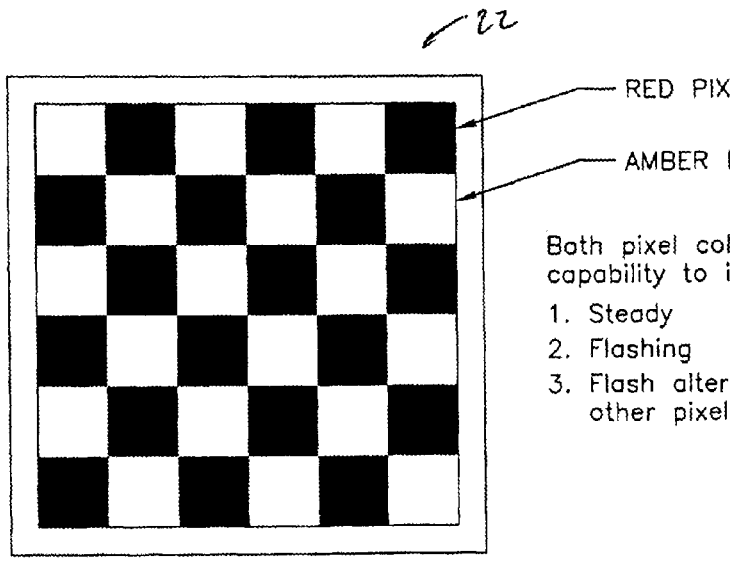
FIGS. 5A-B are exemplary visual indicators that may form part of an alerting device of FIGS. 1-3.

Depicted in FIG. 1 is a portion of a cockpit C of an exemplary aircraft A. Visible in FIG. 1 within cockpit C are windows 10A-D, panels of instruments 14A-B, main glare shield 16, and one or more alerting devices 18 (see also FIGS. 2-3). Also visible in FIG. 1 outside cockpit C are runway R and horizon H. Although FIG. 1 relates to an aircraft A, it alternatively could show portions of a car, truck, bus, or other ground-based vehicle approaching, for example, a roadway or a boat approaching an area of water.

As illustrated in FIG. 1, the field of view of a pilot (whether seated to the left or right of the center of cockpit C) of aircraft A includes forward-looking windows 10B-C for visual acquisition of the runway R. Windows 10B-C are the primary visual source for information relating to the operational control of the aircraft A while it is in the process of decelerating. Accordingly, at least one of alerting devices 18A-B preferably is located within the pilot's field of view, above glare shield 16, and so as to display information at a level approximating that of the pilot's eyes. If two such alerting devices 18A-B are present, one (18A) beneficially may be positioned to the left of the center of cockpit C for use primarily by an operator seated to the left of center, while the other (18B) may be positioned to the right of the center of cockpit C for use primarily by an operator seated to the right of center. One or more devices 18 alternatively or additionally may be mounted to or incorporated into windshield pillar P (see, e.g., devices 18C-D) or incorporated into a heads-up display D.

FIGS. 2-3 show aspects of an exemplary alerting device 18. Device 18 may include a visual indication or display 22, optional mounting post 26, a housing 30, and a glare shield 34. Display 22 preferably comprises multiple pixels, while post 26 (if present) desirably is sufficiently long to position device 18 in the pilot's field of view above main glare shield 16.

Detailed in FIG. 4 are examples of flow paths of information that may be gathered, generated, obtained, or calculated for device 18. Consistent with aspects of the Edwards patent, performance of the wheel brake system of aircraft A may be defined by the relationship between the two forces designated $F_1$ and $F_2$ in FIG. 4, with $F_1$ relating to braking force commanded by the pilot and $F_2$ relating to braking force delivered following operations of an aircraft anti-skid controller. If the difference between $F_1$ and $F_2$ exceeds a preset threshold, for example, a real-time state of degraded braking system performance exists. Existence of degraded system performance in turn suggests alternate techniques may be required by the aircraft operator to mitigate risks such a state represents, causing alert activity on display 22 and on optional aural warning generator 38. Existence of the degraded performance also may, if desired, be recorded for subsequent analysis and transmitted to operators of other craft or elsewhere for receipt, processing, and displaying to those operators.

FIG. 4 also depicts other examples of information that could result in alert activity on display 22. Any or all of the information may be input to control unit 42 (which may be integral with or separate from device 18) for assessment together with information confirming aircraft A has achieved weight on wheels (WOW) since having become airborne or is in the process of decelerating once acceleration has occurred (such as with a rejected takeoff, for example). This information may arrive via a data stream utilizing the flight data acquisition unit of aircraft A as used to deliver information to the flight data recorder and or quick access recorder if the aircraft A is so equipped.

Control unit 42 also may accept input from vehicle operators, cockpit equipment, or otherwise. As an example, at times an aircraft may be considered airworthy notwithstanding inoperative thrust reversers or autobrakes. This inoperability thus may be identified to control unit 42, so no monitoring of the known inoperative equipment need occur.

FIG. 5A illustrates a preferred manner of presenting information on display 22. Although display 22 is shown as comprising a 6×6 set of pixels, it is not restricted to that arrangement and may include more or fewer such pixels. Advantageously, display 22 may comprise sets of alternating red and amber pixels, producing a checkerboard pattern as shown in FIG. 5A. In this case amber pixels may represent cautionary situations, while red pixels may represent emergency situations in which timely pilot response is required.

Display 22 preferably is designed to provide at least (1) flashing amber pixels, (2) flashing red pixels, (3) alternating flashing amber and red pixels, (4) steady illumination of amber pixels, and (5) steady illumination of red pixels. Illumination may be provided in any suitable manner, including (but not limited to) light-emitting diodes (LEDs), fiber optics, or other light sources. Intensity of the pixels may be set differently for day and night operations in coordination with a selection signal generated by the operator for the general instrument panel that is common to most aircraft.

Figure 5B:
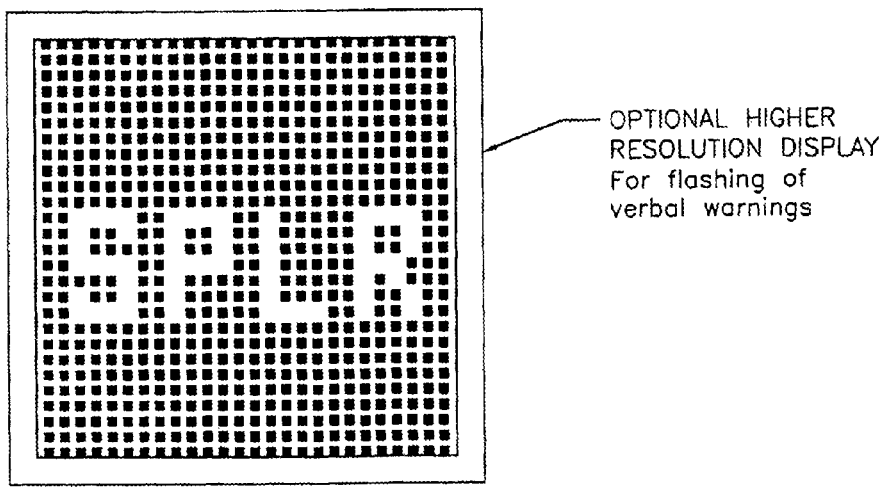

Depicted in FIG. 5B is an alternate display 22 whose pixels are utilized to define letters, words, symbols, etc. In the example of FIG. 5B, the letters "SPLR" are shown, representing the word "SPOILER." In this case display 22 may be alerting an operator to failure or performance degradation of one or more spoilers of the vehicle being operated.

The foregoing is provided for purposes of illustrating, explaining, and describing embodiments of the present invention. Further modifications and adaptations to these embodiments will be apparent to those skilled in the art and may be made without departing from the scope or spirit of the invention.

What is claimed is:

1. A method of controlling a vehicle in the form of an aircraft having a cockpit and at least one generally forward-facing window through which an operator of the vehicle peers while preparing to perform at least some of a first set of actions as the vehicle is travelling on a runway surface during landing, the method comprising:
   a. using a first machine, electronically processing output data from the anti-skid controller of the vehicle in connection with ground deceleration of the vehicle travelling on the runway surface during landing;
   b. using a second machine, electronically displaying the processed information within the cockpit in the normal forward-looking field of vision of the operator through the window so as to alert the operator that performing the first set of actions will not result in effective ground deceleration of the vehicle travelling on the runway surface during landing; and
   c. controlling the vehicle by pursuing a second set of actions based on the electronically-displayed information so as to result in effective ground deceleration of the vehicle travelling on the runway surface during landing, the second set of actions including at least one action selected from the group consisting of (i) employing maximum wheel brake effort, (ii) employing ground spoilers, (iii) employing thrust reverse, or (iv) engaging one or more of ailerons, rudder, elevator, or throttle of the vehicle.

2. A method according to claim 1 in which the act of electronically displaying the processed information comprises illuminating at least one red or amber light source of a display comprising multiple red and amber light sources.

3. A method according to claim 2 in which the act of electronically displaying the processed information comprises illuminating multiple red or amber light sources of the display.

4. A method according to claim 2 in which the act of electronically displaying the processed information comprises causing at least one red or amber light source of the display to flash.

5. A method according to claim 4 in which the act of electronically displaying the processed information comprises causing at least one red and at least one amber light source to flash alternately.

6. A method according to claim 1 in which the act of electronically displaying the processed information comprises illuminating a display positioned above a main glare shield of the cockpit of the aircraft.

7. A method according to claim 1 further comprising generating an aural signal based on the processed information.

8. A method according to claim 1 in which the display is mounted to or incorporated into a pillar of the window.

\* \* \* \* \*